United States Patent
Fengler (10) Patent No.: US 9,650,132 B2
(45) Date of Patent: May 16, 2017

(54) FLYING MACHINE

(71) Applicant: Martin Johannes Fengler, St. Gallen (CH)

(72) Inventor: Martin Johannes Fengler, St. Gallen (CH)

(73) Assignee: METEOMATICS GMBH, St. Gallen (CH)

( * ) Notice: Subject to any disclaimer, the term of this patent is extended or adjusted under 35 U.S.C. 154(b) by 0 days.

(21) Appl. No.: 14/562,155

(22) Filed: Dec. 5, 2014

(65) Prior Publication Data

US 2015/0158581 A1    Jun. 11, 2015

(30) Foreign Application Priority Data

Dec. 9, 2013 (DE) .......................... 10 2013 225 304

(51) Int. Cl.
| | | |
|---|---|---|
| *B64C 27/08* | (2006.01) | |
| *A63H 27/133* | (2006.01) | |
| *B64C 27/16* | (2006.01) | |
| *B64C 39/02* | (2006.01) | |
| *A63H 27/00* | (2006.01) | |

(52) U.S. Cl.
CPC .............. *B64C 27/08* (2013.01); *B64C 27/16* (2013.01); *B64C 39/024* (2013.01); *A63H 27/12* (2013.01); *B64C 2201/027* (2013.01)

(58) Field of Classification Search
CPC ....... B64C 27/08; B64C 27/16; B64C 39/028; A63H 27/12
See application file for complete search history.

(56) References Cited

U.S. PATENT DOCUMENTS

| | | | |
|---|---|---|---|
| 2,949,693 A | 8/1960 | McRoskey | |
| 5,297,759 A | 3/1994 | Tilbor et al. | |
| 5,634,839 A | 6/1997 | Dixon | |
| 6,688,936 B2 * | 2/2004 | Davis ..................... | A63H 27/12 446/175 |
| 6,811,460 B1 * | 11/2004 | Tilbor .................... | A63H 27/12 446/34 |

(Continued)

FOREIGN PATENT DOCUMENTS

| | | |
|---|---|---|
| DE | 1718496 U | 3/1956 |
| DE | 6802033 | 5/1969 |

(Continued)

OTHER PUBLICATIONS

Neuer Software-Algorithmus macht Quadrocopter sicherer; Apr. 12, 2013 | Redaktion | Forschung.

(Continued)

*Primary Examiner* — Tien Dinh
*Assistant Examiner* — Richard R Green
(74) *Attorney, Agent, or Firm* — Squire Patton Boggs (US) LLP (57) ABSTRACT

In accordance with the invention, a flying machine is provided comprising at least two passive lift elements arranged substantially radial-symmetrically about a yaw axis of the flying machine, wherein the passive lift elements are configured to jointly generate a torque at the yaw axis upon movement of the flying machine substantially in parallel to the yaw axis. The flying machine further comprises active lift generating means, which are arranged substantially at distal ends of the passive lift elements.

11 Claims, 4 Drawing Sheets

(56) References Cited

U.S. PATENT DOCUMENTS

| | | |
|---|---|---|
| 7,497,759 B1 | 3/2009 | Davis |
| 2005/0121553 A1 | 6/2005 | Isawa et al. |
| 2006/0121818 A1 | 6/2006 | Lee et al. |
| 2010/0243794 A1 | 9/2010 | Jermyn |
| 2011/0017865 A1 | 1/2011 | Achtelik et al. |
| 2011/0024553 A1 | 2/2011 | Choi |
| 2012/0099983 A1* | 4/2012 | Medlock .............. A63H 27/12 415/208.1 |
| 2013/0068877 A1 | 3/2013 | Choi et al. |

FOREIGN PATENT DOCUMENTS

| | | |
|---|---|---|
| DE | 2305856 | 8/1974 |
| DE | 20218263 U1 | 1/2003 |
| DE | 202005008775 U1 | 9/2005 |
| DE | 202006013909 U1 | 2/2007 |
| DE | 102008014853 A1 | 10/2009 |
| DE | 102011054195 A1 | 4/2013 |
| DE | 202013102796 U1 | 8/2013 |
| WO | 2012030076 A2 | 3/2012 |

OTHER PUBLICATIONS

English Abstract for DE102011054195(A1).
English Abstract for DE102008014853(A1).

\* cited by examiner

FLYING MACHINE

CROSS REFERENCE TO RELATED APPLICATIONS

This application claims foreign priority to German Patent Application No. 102013225304.4 filed Dec. 9, 2013, under 35 U.S.C. §119, the entire contents of which are incorporated herein by reference thereto.

BACKGROUND

The present invention relates to a flying machine.

The document US 2010/0243794 A1 discloses a flying machine comprising two or more rotor means (for example a quadrocopter) including a central portion on which an electronic control means is arranged as well as arms extending radially outwardly from the central portion which take a cross shape when viewed from above. At the free ends of the four arms rotor means are arranged. Furthermore, the quadrocopter includes a stabilizing device.

The utility model DE 20 2006 013 909 U1 discloses a flying machine having a modular design, especially a quadrocopter, comprising a base element, extensions arranged in cross shape and a respective drive unit including air propeller at each of the four ends of the extensions, wherein the extensions are detachably mounted on the base element via plug-in and screwed connections. In the case of impact, the utility model provides plural impact brackets spanning in the longitudinal and transverse directions for the protection of an electronic system arranged in the area of the base element, an impact protection for gear-wheels and/or motors of the drive units as well as an exchangeable landing frame absorbing hard shocks.

Even if these protective devices according to the utility model are capable of preventing or at least reducing damage which an impact caused by a too hard landing could do to the electronic system, gearwheels/motors or the structure, destruction of the flying machine can probably not be prevented in the case of crash from big height. Equally, although the flying machine itself can be protected to a limited extent by the suggested measures, however protection of objects and creatures on the ground, for example buildings and human beings, against the flying machine falling down cannot be guaranteed. Crash of the flying machine might be caused by partial or complete failure of the drive. In such case in which the lift required to maintain the flying machine in the air cannot be generated by the drive any longer, the flying machine will fall down at an increasing speed. Depending on the last flying position in which the drive was still working and on whether the drive partly or completely fails, the flying machine in addition can start tumbling and can fall down in a completely uncontrollable manner.

The utility model DE 20 2005 008 775 U1 discloses an emergency system for a toy flying machine. The emergency system comprises an inflatable parachute consisting of a shaped double-walled chamber which is inflated by compressed air based on a control command for inflating the parachute. For this purpose, the emergency system further comprises a compressed-air cartridge, a trigger mechanism for the compressed-air cartridge as well as a radio signal receiver for receiving the control command. Furthermore, a common parachute is mentioned as emergency means.

The emergency system thus requires plural components, viz. the parachute itself and, in addition, a control system for the parachute which, according to the utility model, consists of a compressed-air cartridge, a trigger mechanism as well as a radio signal receiver. Alternatively to the radio signal receiver, also a sensor system and control logics for independently detecting a case of crash and triggering the parachute would be imaginable. Both the compressed-air cartridge and the trigger mechanism have to be maintained to ensure the functionality thereof in the case of crash, which causes expenditure and costs. Furthermore, after triggering components have to be exchanged, for example the compressed-air cartridge, or in the case of a common parachute a blasting capsule as trigger mechanism, which equally would cause expenditure and costs.

Moreover, it is endeavored to adapt the control software of multicopters so that in the case of partial failure of the drive system of a multicopter, for example in the case of failure of a rotor means of the multicopter, the multicopter is maintained to be flying with the aid of the remaining still functioning rotor means or the emergency landing thereof is made possible in that the remaining rotor means compensate for the lift component missing due to the failure and the multicopter is especially put into a controlled tumbling movement, for example. These endeavors become the more complicated and an actual prevention of crash becomes the more improbable, the fewer rotor means are provided on the multicopter and the more rotor means in fact fail. In particular, reduction of damage in the case of crash is not possible by these measures, when a lot of or all rotor means fail. Furthermore, this measure requires additional sensors and reliable failure detection.

The document WO 2012/030076 A2 discloses a flying machine having a vertical central shaft and a motor and a power rotor arranged on an upside of the shaft. The power rotor enables the flying machine to ascend and descend. On the side of the central shaft three fixing plates are arranged. On each of the fixing plates an adjusting motor having an adjusting rotor, respectively, is arranged. When the power rotor rotates, an anti-torque is generated at the central shaft. The adjusting rotors enable compensation of the anti-torque, thereby allowing stops, left turns, right turns, etc. The fixing plates may be inclined such that a downwash of the power rotor collides with the inclined fixing plates, thereby compensation part of the anti-torque such that energy consumption by the adjusting motors can be reduced.

Further prior art is known from documents U.S. Pat. No. 7,497,759 B1, DE 202 18 263 U1, DE 68 02 033 U, DE 23 05 856 A, DE 17 18 496 U, US 2005/0121553 A1, US 2006/0121818 A1, US 2011/0024553 A1, US 2013/0068877 A1, U.S. Pat. Nos. 2,949,693 A, 5,297,759 A, 5,634,839 A, and DE 20 2013 102 796 U1.

Accordingly it is desirable to provide an improved flying machine.

SUMMARY OF THE INVENTION

Therefore, the object underlying the invention stated in the independent claim is to provide a flying machine in such way that damage caused by crash can be minimized.

This object is achieved by a flying machine according to the independent claim. Advantageous further developments of the invention are stated in the dependent claims.

According to the invention, for this purpose a flying machine is provided comprising at least two passive lift elements arranged substantially radial-symmetrically about a yaw axis of the flying machine, wherein the passive lift elements are arranged to jointly generate together a torque at the yaw axis upon movement of the flying machine substantially in parallel to the yaw axis. The flying machine further includes active lift generating means. These active lift generating means are arranged substantially at distal ends of the passive lift elements.

The torque generated at the yaw axis of the flying machine may bring about a rotation of the flying machine about the yaw axis, thereby the position of the flying machine being stabilized in space and the crash velocity being reduced. The arrangement of the active lift generating means at the passive lift generating means prevents additional arrangement of elements supporting the active lift generating means. The multiple utilization of a component part, for example the passive lift elements, offers the advantage of saving weight. A lighter flying machine cannot only be lifted into the air and be held in the air with less energy expenditure, but the fall velocity thereof can also be reduced more easily in the case of crash, as it holds less potential energy.

The passive lift elements of such flying machine can be full-surface elements and can extend away from the yaw axis in a longitudinal direction.

Such arrangement offers the advantage that a torque can be generated specifically at the yaw axis of the main body.

Furthermore a lower side of each passive lift element related to a plane perpendicular to the yaw axis may have an area inclined transversely to the respective longitudinal direction.

A draft caused by ambient air can be efficiently converted to rotation of the flying machine by passive lift elements arranged and configured in this way.

Also, inclination of the inclined area may increase with an increasing distance from the yaw axis.

Moreover, each passive lift element can include at least one portion having a profile transversely to the respective longitudinal direction so that the passive lift elements are arranged for generating a dynamic lift at the respective portions by rotation of the passive lift elements about the yaw axis caused by the torque.

A dynamic lift generated in this way can additionally reduce the crash and/or fall velocity of the flying machine.

According to the invention, the profile can be increasingly twisted about an axis corresponding to the respective longitudinal axis in a path along the respective longitudinal direction.

The passive lift elements can be configured for jointly generating the torque at the yaw axis of the flying machine by means of air flowing against the passive lift elements substantially from below.

Each of the active lift generating means can have a motor and a rotor driven by the motor.

The flying machine according to the invention moreover may comprise a main body. This main body may include a first portion on which the passive lift elements are arranged and a second portion which is connected to the first portion while being supported to be freely rotatable about the yaw axis.

Since in this way it is not necessary to overcome the mass inertia of the complete main body but only the mass inertia of the passive lift elements, and the active lift generating means, where necessary, as well as of the first portion of the main body, rotation is started earlier, whereby also the reduction of the fall velocity can be initiated at an earlier point in time.

Furthermore, the main body can include a slip ring contact and/or a ball bearing contact as a movable electric contact for producing an electric connection between the first portion and the second portion.

The flying machine can further include an electric supply means accommodated in the second portion.

Since an electric supply means usually has a great share in the total mass of a flying machine, the mass inertia to be overcome can be efficiently reduced while offering the afore-demonstrated advantages.

In accordance with an advantageous further development of the invention, a geometry and/or mass distribution of the flying machine can be chosen so that the flying machine adopts a horizontal flying position in the case of movement of the flying machine substantially in parallel to the yaw axis when an active lift generation is missing.

A flying position orientated in this way may promote the effects achieved by the passive lift elements according to the invention.

The flying machine according to the invention may be a multicopter.

BRIEF DESCRIPTION OF THE DRAWINGS

Preferred embodiments of the present invention are shown in the Figures and will be illustrated hereinafter.

DETAILED DESCRIPTION OF THE EMBODIMENTS

Figure 1:
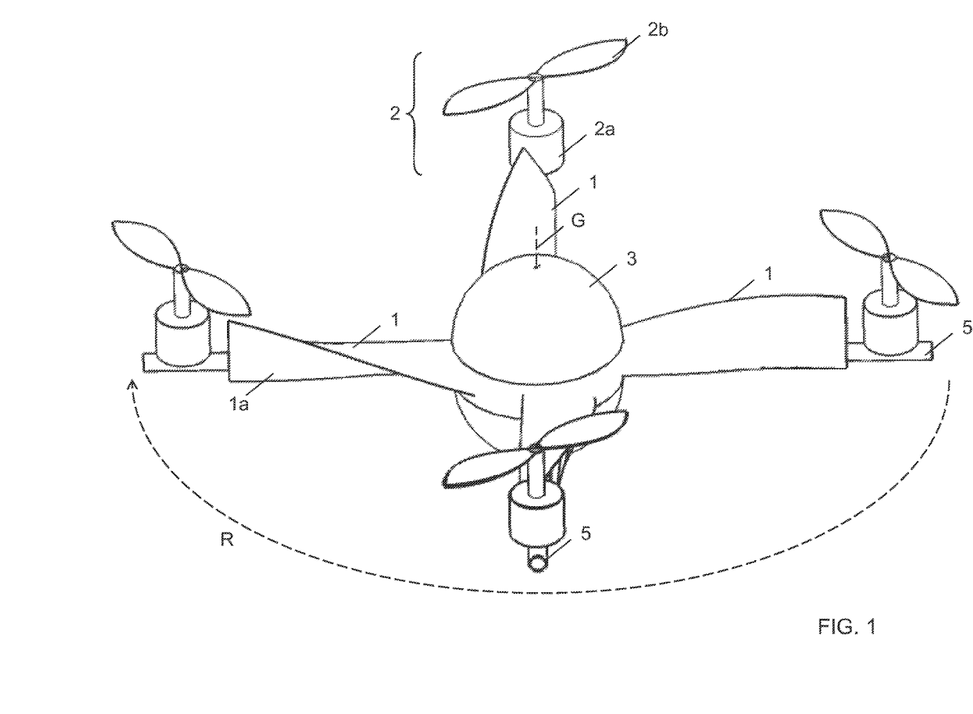
FIG. 1 shows a schematic representation of a flying machine according to the invention slanted from above.
Figure 2:
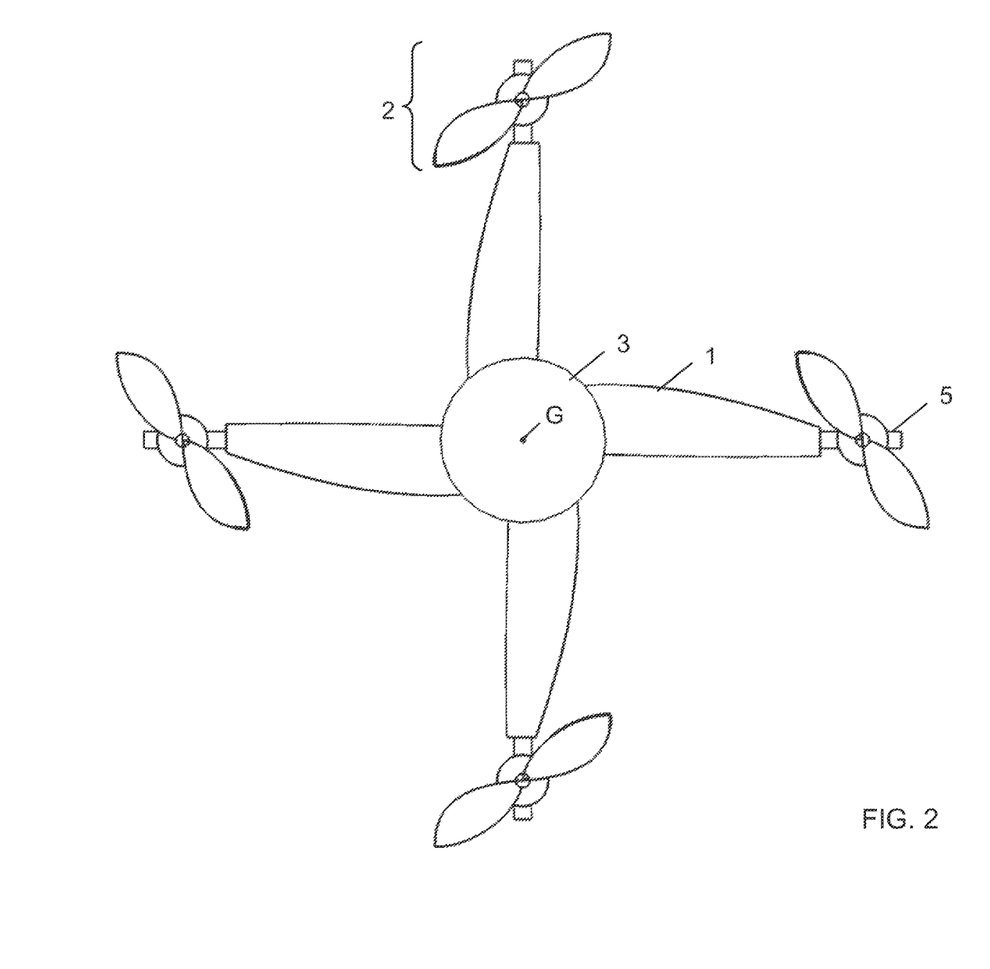
FIG. 2 is a schematic representation of the flying machine according to the invention from above.
Figure 3:
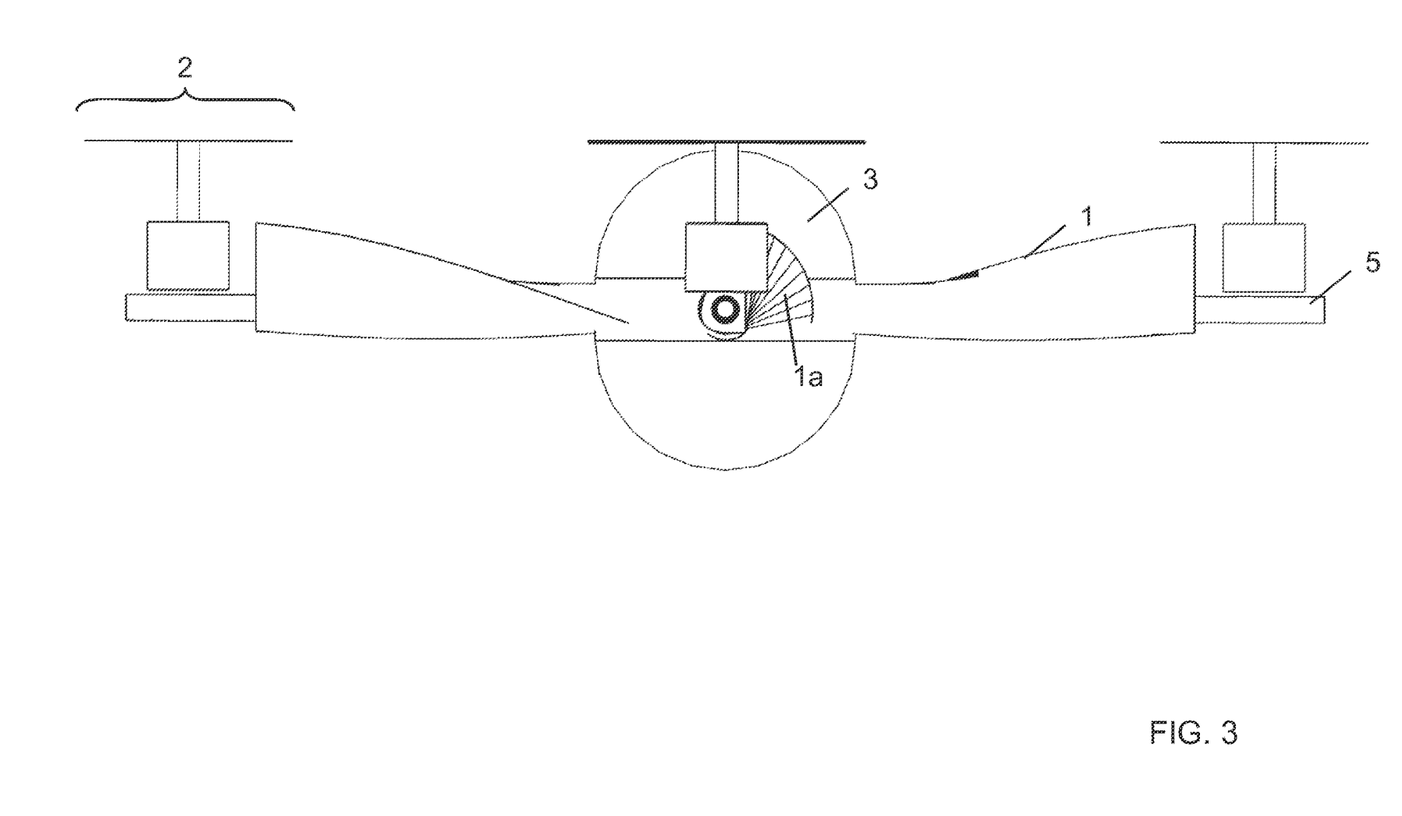
FIG. 3 is a schematic representation of a flying machine according to the invention from one side.

FIGS. 1 to 3 illustrate a schematic representation of a flying machine according to the invention.

In particular, FIGS. 1 to 3 show an exemplary quadrocopter as a popular example of the group of multicopters or multi-rotorcraft, wherein a multicopter represents an advantageous configuration of the flying machine according to the invention. The present invention is not limited either to quadrocopters or to multicopters, however.

As is shown in FIG. 1, the flying machine according to the invention includes at least two passive lift elements 1 arranged substantially radial-symmetrically about a yaw axis G of the flying machine. Especially the example in FIGS. 1 and 2 shows a flying machine comprising four passive lift elements 1.

In radial symmetry a theoretical rotation of the object, in this case the arrangement of the passive lift elements 1, about a defined angle about an axis of rotation, in this case about the yaw axis G of the flying machine, renders the object (spatially) congruent to itself again.

The yaw axis G is defined in this case substantially by rotation of the flying machine generated in the case of crash of the flying machine by means of the passive lift elements 1 (marked by arrow R in FIG. 1) as the axis of rotation thereof (i.e. the axis about which the flying machine substantially rotates).

In the case of crash of the flying machine, viz. for example when a lift usually supporting the flying machine is no longer available, the flying machine moves downwards due to gravitation. During movement of the flying machine substantially in parallel to the yaw axis G in the direction of the ground a torque is jointly generated at the yaw axis G by means of the passive lift elements 1.

Here it is noted that when rotating about the yaw axis G upon movement downwards due to the gravity, the yaw axis G itself may rotate about an axis parallel to but different from the yaw axis G, and/or may differ from parallelism to the moving/falling direction (downwards due to the gravity) a bit.

The passive lift elements 1 are configured so that the torque is jointly generated at the yaw axis G of the flying machine by means of air substantially flowing against the passive lift elements 1 from below. By the downward movement air flows from below against the passive lift elements 1, as they form a defined air draft surface. The passive lift elements 1 are shaped so that the airflow is deflected by the same in a directed way and a torque is generated at a yaw axis G.

Each of the passive lift elements 1 shown in FIGS. 1 to 3 is a full-surface element and extends away from the yaw axis G in a longitudinal direction.

Full-surface in this case is not exhausted in a plane surface but may take any possible shape including a curved shape, a twisted shape, a gently curving shape, a stepped shape or a differently structured shape or surface. Moreover, FIGS. 1 to 3 show the longitudinal direction of the respective passive lift elements 1 as the direction facing away from the yaw axis G along which the respective passive lift element 1 extends.

As is illustrated in FIGS. 1 and 2, the passive lift elements 1 can be arranged especially in star shape. Star-shaped in this context means that, viewed from the yaw axis G of the flying machine, the lift elements 1 extend radially in different directions. Advantageously between the different directions related to the yaw axis G equal angular intervals are located for converting propelling force generated by the lift elements 1 due to the flowing air to a torque at the yaw axis G and in this way permitting a stable position of the flying machine in space during the crash or descent.

Advantageously, the lift elements 1 are further located substantially in one plane (perpendicularly to the yaw axis G). It is also imaginable, however, to arrange them in several planes as long as the arrangement ensures that the propelling forces generated by the respective passive lift elements 1 of one plane are converted to a torque at the yaw axis G.

The passive lift elements are arranged substantially rigidly relative to each other. In this context the term substantially especially means that a possible bending or torsion of the lift elements, for example, is not taken into account.

As can be inferred especially from FIGS. 1 and 3, a lower side 1*a* of each passive lift element 1 related to a plane perpendicular to the yaw axis G has an area inclined transversely to the respective longitudinal direction.

A plane perpendicular to the yaw axis G could be the plane, for example, which is spanned by the four passive lift elements 1 shown in FIG. 1 or the plane shown by the perspective view in FIG. 2. An inclination present transversely to the longitudinal direction of a passive lift element 1 thus becomes clear by the fact that the lower side, viewed from the yaw axis G, is inclined in one direction at least in portions, for instance.

Due to this inclination a propelling force can be generated at a passive lift element 1 by the air flowing against the same from below. So that these propelling forces generated by the lift elements 1 can be converted to a torque at the yaw axis G it is of advantage that all lift elements 1 have the same inclination of the lower side 1*a*, especially the same direction of inclination. From the yaw axis G the lower sides 1*a* of all lift elements 1 of the exemplary flying machine illustrated in FIGS. 1 to 3 would be slanted from the right-hand bottom to the left-hand top. However, also imaginable is an inclination of all lower sides 1*a* from the left-hand bottom to the right-hand top. The radial symmetry on which the arrangement of the passive lift elements 1 according to the invention is substantially based has to be understood in a spatial respect so that the afore-mentioned advantageous identity can be realized.

Especially FIG. 3 shows an inclination of the lower side 1*a* increasing with an increasing distance from the yaw axis G, which is indicated by the subdivision into differently inclined areas. It is noted in this context, however, that although the inclination may vary stepwise, in a preferred manner it is a continuous course of a variation of inclination, however.

In a simple configuration the inclination is constant, however, over the entire length of a passive lift element 1.

The lift elements 1 according to the invention are not restricted to the gently curving profile exemplified in FIGS. 1 to 3. They can as well be embodied, as afore-described, merely by straight inclined elements which enforce a rotation.

The torque generated at the yaw axis G drives the flying machine to rotate about the yaw axis G in the case of crash or descent, as indicated by the arrow R. The potential energy of the flying machine is thus converted to rotational energy in the case of crash or descent. In this way the fall velocity of the flying machine can be efficiently reduced.

The profile exemplified in FIGS. 1 to 3 (transversely to the respective longitudinal direction) of each lift element 1 includes at least one portion according to an advantageous development of the invention, however, so that the passive lift elements 1 are configured for generating a dynamic lift at the respective portions by means of rotation of the passive lift elements 1 about the yaw axis G caused by the torque.

That is to say that the lift elements 1 driven to rotate at least in areas are shaped such that air flowing from ahead and flowing around the profile of the passive lift elements 1 by the propelling movement of the lift elements 1 generates a lift in these areas.

This lift, i.e. the dynamic lift, is capable of further reducing the fall velocity of the flying machine. In so doing, an auto-rotational effect is exploited, as the propulsion required for generating the dynamic lift is generated exclusively by means of the air flowing from below in the case of crash or descent.

As is evident especially from FIGS. 1 and 3, according to an advantageous development of the invention the profile is increasingly twisted about an axis corresponding to the respective longitudinal direction in a course along the respective longitudinal direction.

By the profiling of the passive lift elements 1 illustrated in FIGS. 1 to 3 and described in the foregoing a propulsion can be generated by the same lift element 1 with the aid of the air flowing from below and a dynamic lift can be generated with the aid of the air flowing from ahead and flowing around. In support of this effect, according to the shown profile path moreover an upper side of each of the lift elements 1 exhibits an inclination and curvature varying in a directed manner.

Furthermore, an advantageous further development of the flying machine according to the invention includes active lift generating means 2 as a drive system.

The flying machine exemplified in FIGS. 1 to 3 shows a quadrocopter, i.e. a multicopter having four active lift generating means 2 as the most wide-spread arrangement of multicopters. However, the present invention is not limited to four active lift generating means 2, but can be applied to any flying machine and especially to any multicopter including active lift generating means 2.

The active lift generating means 2 are arranged substantially at distal ends of the passive lift elements 1. This arrangement is not restricted to a fastening to end points of the passive lift elements 1.

Rather, the passive lift elements 1 can equally be embodied by support means 5 at the substantially distal end of which the active lift generating means 2 are arranged which consequently support or bear the active lift generating means 2. The term embodied in this case is not merely restricted to an integral arrangement of the support means 5 as the passive lift elements 1. Rather, it also comprises solutions, for example, in which the support means 5 are merely lined so that the respective lining adopts the shape and the function of the lift elements 1 according to the invention or in which molded elements adopting the shape and the function of the passive lift elements 1 according to the invention are arranged at the support means 5.

Furthermore, support elements 5 supporting the passive lift elements 1 and the active lift generating means 2 may be arranged independently (separately) from each other without deviating from the invention.

It is further suggested to provide the passive lift elements 1 (and, resp., corresponding support means 5) with cavities so as to save weight.

The active lift generating means 2 can consist, according to the invention, of a motor 2a, especially an electric motor, and a rotor 2b driven by the motor 2a.

It is further imaginable that all active lift generating means 2 consist of respective rotors 2b all of which are driven by a (for example centrally arranged) joint motor via a distribution mechanism.

As is moreover evident from FIGS. 1 to 3, the flying machine includes a main body 3. The main body 3 may include both elements required for the flight itself, for example a power supply such as a battery and a control means such as control electronics, and additional elements (transported load) such as, for example, a sensor equipment (camera, IR sensors etc.).

Figure 4:
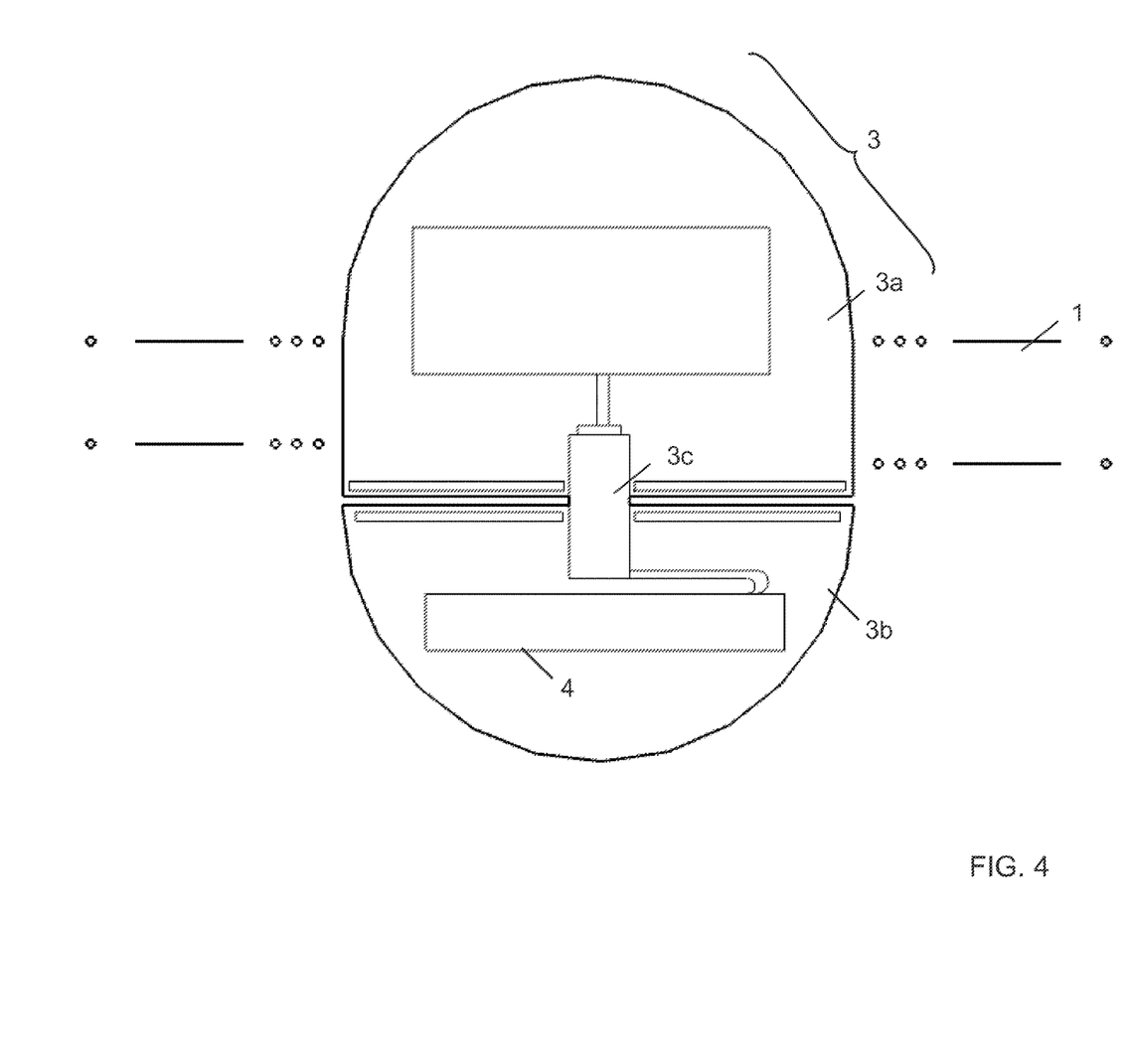
FIG. 4 is a schematic representation of a main body of the flying machine according to the invention.

FIG. 4 illustrates a schematic representation of a main body 4 of the flying machine according to the invention. Especially a cut across an exemplary main body 3 according to another advantageous development of the invention is shown.

As is illustrated in FIG. 4, the main body 3 according to this further development consists of two portions 3a and 3b. At an upper (first) portion 3a the passive lift elements 1 and the support means 5, resp., are attached, arranged and connected thereto, respectively. This means that the upper portion rotates about the yaw axis G with the lift elements 1 in the case of rotation caused by crash or descent. For this purpose, the torque generated at the yaw axis G first has to overcome the mass inertia moment of the object to be rotated. The lighter the object to be rotated, the more quickly the inertia moment thereof can be overcome and the earlier the reduction of the fall velocity can begin.

Heavy parts of the flying machine (of the main body 3 of the flying machine) therefore are advantageously accommodated in a lower (second) portion 3b of the main body 3 which is connected to the upper portion 3a while being supported to be freely rotatable about the yaw axis G. The inertia moment of the heavy parts (for example a battery/an accumulator as electric supply means 4) thus need not be overcome.

The rotatable support may be provided by a rotating axis. In order to provide an electrical connection between the upper portion 3a and the lower portion 3b, according to an advantageous further development of the invention the flying machine may include a movable electrical contact 3c, preferably a slip ring contact or a ball bearing contact, at the rotating axis. Then flight electronics and/or sensor electronics can be arranged in the upper portion 3a, while the flying machine further includes an electric supply means 4 accommodated in the lower portion 3b.

The movable electric contact 1c is not restricted to a slip ring contact and/or a ball bearing contact, but it may be configured by any type of contacting that allows an unrestricted movement of rotation without disconnecting the electrical contact.

Despite the advantages which such split main body 3 entails, the invention is equally applicable to a flying machine including no main body 3, including a one-part main body 3 or including a multi-split main body 3.

In accordance with the invention, the geometry and/or mass distribution of the flying machine is chosen so that, when the flying machine is moving substantially in parallel to the yaw axis G while an active lift generation is missing, the flying machine adopts a horizontal flying position. Such flying position promotes the beneficial effects especially of the passive lift elements 1. Appropriate measures include, for example, an arrangement of heavy components in a lower area of the flying machine in general and of a main body 3 of the flying machine in particular. Furthermore, tilting of the flying machine into the desired position as soon as air is flowing against the same (for example by falling down) can be achieved by constructional measures. For instance, such behavior can be promoted by arranging the rotors 2b of the active lift generating means 2 at an as large distance as possible (along the yaw axis G) from heavy components arranged most closely to the bottom.

In general, according to the invention a flying machine is provided comprising at least two passive lift elements 1 arranged substantially radial-symmetrically about a yaw axis G of the flying machine, the passive lift elements 1 being configured to jointly generate a torque at the yaw axis G upon movement of the flying machine substantially in parallel to the yaw axis G.

The flying machine according to the invention can minimize damage caused by crash by maintenance-free and failsafe means. In accordance with the invention, in the case of complete or partial failure of a drive (an actively generated lift) especially uncontrolled tumbling of the flying machine is prevented and fall velocity is reduced so as to protect the flying machine and the transported load as well as objects and creatures on the ground against the effects of an excessively strong impact of the falling flying machine.

What is claimed is:

1. A flying machine comprising:
    at least two passive lift elements (1) arranged substantially radial-symmetrically about a yaw axis (G) of the flying machine, and
    active lift generating means (2), wherein
    the passive lift elements (1) are configured to jointly generate a torque at the yaw axis (G) upon movement of the flying machine in parallel to the yaw axis (G) so as to apply positive pressure on the passive lift elements (1) from below,
    the active lift generating means (2) are arranged substantially at distal ends of the passive lift elements (1),
    the passive lift elements (1) are full-surface elements and extend away from the yaw axis (G) in a longitudinal direction, and
    each passive lift element (1) includes at least one portion having a profile transversely to the respective longitudinal direction so that the passive lift elements (1) are configured to generate a dynamic lift at the respective portions by means of rotation (R) of the passive lift elements (1) about the yaw axis (6) caused by the torque.

2. The flying machine according to claim 1, wherein a lower side (1*a*) of each passive lift element (1) related to a plane perpendicular to the yaw axis (G) includes an area inclined transversely to the respective longitudinal direction.

3. The flying machine according to claim 2, wherein the inclined area becomes more inclined with an increasing distance from the yaw axis (G).

4. The flying machine according to claim 1, wherein in a course along the respective longitudinal direction the profile is increasingly twisted about an axis corresponding to the respective longitudinal direction.

5. The flying machine according to claim 1, wherein the passive lift elements (1) are configured to jointly generate the torque at the yaw axis (G) of the flying machine by means of air flowing against the passive lift elements (1) from below.

6. The flying machine according to claim 1, wherein each of the active lift generating means (2) includes a motor (2*a*) and a rotor (2*b*) driven by the motor (2*a*).

7. The flying machine according to claim 1, further comprising
a main body (3),
wherein the main body (3) includes a first portion (3*a*) on which the passive lift elements (1) are arranged and a second portion (3*b*) which is connected to the first portion (3*a*) while being supported to be freely rotatable about the yaw axis (G).

8. The flying machine according to claim 7, wherein the main body (3) includes a slip ring contact (3*c*) or a ball bearing contact (3*c*) as a movable electrical contact for making an electrical connection between the first portion (3*a*) and the second portion (3*b*).

9. The flying machine according to claim 7, wherein the flying machine further includes an electric supply means (4) accommodated in the second portion (3*b*).

10. The flying machine according to claim 1, wherein the geometry or the mass distribution of the flying machine is chosen so that upon movement of the flying machine in parallel to the yaw axis (G) while an active lift generation is missing the flying machine adopts a horizontal flying position.

11. The flying machine according to claim 1, wherein the flying machine is a multicopter.

* * * * *